(12) United States Patent
Lin et al.

(10) Patent No.: US 12,320,061 B2
(45) Date of Patent: Jun. 3, 2025

(54) SIZING AGENT COMPOSITION, CARBON FIBER MATERIAL AND COMPOSITE MATERIAL

(71) Applicant: FORMOSA PLASTICS CORPORATION, Kaohsiung (TW)

(72) Inventors: Sheng-Shiun Lin, Kaohsiung (TW); Yu-Sheng Li, Kaohsiung (TW); Ching-Cheng Chung, Kaohsiung (TW); Cheng-Chun Chou, Kaohsiung (TW); Long-Tyan Hwang, Kaohsiung (TW)

(73) Assignee: FORMOSA PLASTICS CORPORATION, Kaohsiung (TW)

( * ) Notice: Subject to any disclaimer, the term of this patent is extended or adjusted under 35 U.S.C. 154(b) by 608 days.

(21) Appl. No.: 17/831,816

(22) Filed: Jun. 3, 2022

(65) Prior Publication Data
US 2022/0396914 A1 Dec. 15, 2022

(30) Foreign Application Priority Data
Jun. 3, 2021 (TW) ................. 110120317

(51) Int. Cl.
*D06M 15/592* (2006.01)
*D06M 15/53* (2006.01)
(Continued)

(52) U.S. Cl.
CPC .......... *D06M 15/592* (2013.01); *D06M 15/53* (2013.01); *D06M 15/55* (2013.01);
(Continued)

(58) Field of Classification Search
CPC .... D06M 15/592; D06M 15/53; D06M 15/55; D06M 15/71; D06M 23/14;
(Continued)

(56) References Cited

U.S. PATENT DOCUMENTS

| | | | | |
|---|---|---|---|---|
| 5,239,046 A | * | 8/1993 | Lubowitz | ................ C08J 5/243 |
| | | | | 528/229 |
| 5,708,128 A | | 1/1998 | Oikawa et al. | |
| 2020/0123708 A1 | * | 4/2020 | Geng | ..................... B32B 15/09 |

FOREIGN PATENT DOCUMENTS

| | | |
|---|---|---|
| CN | 102912637 A | 2/2013 |
| CN | 103174026 A | 6/2013 |

(Continued)

OTHER PUBLICATIONS

Search Report for Application No. 22176904.5 dated Nov. 2, 2022 (Year: 2022).*

*Primary Examiner* — Daniel C. McCracken
(74) *Attorney, Agent, or Firm* — MUNCY, GEISSLER, OLDS & LOWE, P.C.

(57) ABSTRACT

The present application relates to a sizing agent composition, a carbon fiber material and a composite material. The sizing agent composition includes a first composition solution and a second composition solution, and those solutions respectively has specific compound. The sizing agent comprising the composition has an excellent bonding property with a carbon fiber, and further the sizing agent can efficiently enhance heat resistance, wear resistance and processability of the carbon fiber material. The carbon fiber material sized with the sizing agent has a high adhesion property with specific resin material, therefore producing the composite material with high processability.

17 Claims, 2 Drawing Sheets

(51) Int. Cl.
  *D06M 15/55* (2006.01)
  *D06M 15/71* (2006.01)
  *D06M 23/14* (2006.01)
  *D06M 101/40* (2006.01)

(52) U.S. Cl.
  CPC ............ *D06M 15/71* (2013.01); *D06M 23/14* (2013.01); *D06M 2101/40* (2013.01); *D06M 2200/40* (2013.01)

(58) Field of Classification Search
  CPC ......... D06M 2101/40; D06M 2200/40; D06M 15/59; D06M 13/368; C08J 2371/00; C08J 5/042; C08J 5/06; C08G 73/10; C08L 79/08; C08L 61/16; C08L 81/08; C08L 71/10; C08K 7/06; C08K 9/04; C08K 9/08; C08K 3/04
  See application file for complete search history.

(56) References Cited

FOREIGN PATENT DOCUMENTS

| | | |
|---|---|---|
| CN | 107407043 A | 11/2017 |
| CN | 109162101 A | 1/2019 |
| CN | 110709553 A | 1/2020 |
| CN | 111410759 B | 12/2020 |
| JP | H0156191 B2 | 11/1989 |
| JP | H05272064 A | 10/1993 |
| JP | H08503031 A | 4/1996 |
| JP | 2540555 B2 | 10/1996 |
| JP | H08302572 A | 11/1996 |
| JP | H09111119 A | 4/1997 |
| TW | 201634782 A | 10/2016 |
| WO | WO2016/143371 A1 | 9/2016 |
| WO | WO2019/012856 A1 | 1/2019 |

\* cited by examiner

SIZING AGENT COMPOSITION, CARBON FIBER MATERIAL AND COMPOSITE MATERIAL

BACKGROUND

Field of Invention

The present application relates to a sizing agent composition. More particularly, the present application provides a sizing agent composition that can effectively improve the heat resistance and wear resistance of carbon fibers and has excellent bonding properties with the carbon fibers, a carbon fiber material comprising the sizing agent composition and a composite material.

Description of Related Art

The resin matrix of the composite materials is continuously developed with the advancement of technology and the requirements of performance. The high performance engineering plastics (such as polyether ether ketone, polyether ketone ketone, polyaryl ether ketone and the like) which belong to thermoplastic resins have excellent heat resistance, flame retardancy, self-lubrication, mechanical properties, insulation properties, hydrolysis resistance, drug resistance, biocompatibility and chemical stability, and therefore they are often used to manufacture the thermoplastic composite materials applied in the fields of electronics, aerospace, automotive and medical.

Because carbon fibers have higher specific strength and specific modulus and have good heat resistance, chemical resistance and electrical conductivity, they are widely used as reinforcing materials of the resin matrix in the composite materials. In the processes of production and processing, defects of hairiness and single filament breakage are easily presented in the carbon fibers due to mechanical frictions, and therefore properties thereof are decreased. Accordingly, surfaces of the carbon fibers are coated with a sizing agent to form a protective film, thereby improving the wear resistance and the strand integrity of the carbon fibers. Besides, the carbon fibers are necessary to completely impregnated with the resin matrix for preventing from forming voids in the interior of the composite materials during manufacturing the composite materials, and therefore the sizing agent on the surfaces of the carbon fibers can simultaneously improve the bonding properties between the resin matrix and the carbon fibers to enhance the bonding strength.

However, the conventional sizing agent of the carbon fiber materials belongs to an epoxy resin material, and thus it has poor compatibility with the thermoplastic resin matrix. Furthermore, thermal degradation temperature of the epoxy resin is about 250° C., but molding temperatures of the high performance engineering plastics are all greater than 250° C. Therefore, the conventional epoxy resin based sizing agents for the carbon fiber materials have been thermally decomposed at the processing temperature of the high performance engineering plastics, and further the bonding properties between the carbon finer materials and the resin matrix are hard to be maintained. Accordingly, the conventional epoxy resin based sizing agents cannot to be applied in the composite materials comprising the high performance engineering plastics.

Based on the aforementioned defects of heat resistance, the high performance engineering plastics (such as polyether imide (PEI), polyaryl ether ketone (PAEK) and the like) are used as a main agent of the sizing agent in a conventional technique. Chloroform is necessary to be applied in the sizing agent containing polyether imide, and manufacturing cost thereof is expensive, such that the sizing agent cannot meet the requirements of environmental protection and commercial value. A large amount of organic solvents are necessary to be used in the sizing agent containing polyaryl ether ketone, and therefore the solvents need to additionally be removed. Further, the sizing agent containing polyaryl ether ketone has higher crystallinity, such that the carbon fibers covered by the sizing agent have excessive hardness, thereby being hard to be wound.

Accordingly, there is an urgent need to provide a sizing agent composition, a carbon fiber material and a composite material for improving the defects of the conventional sizing agent, the carbon fiber material containing the same and the obtained composite material.

SUMMARY

Therefore, an aspect of the present application is to provide a sizing agent composition. The sizing agent composition has a specific composition and can effectively improve the heat resistance and wear resistance of the carbon fiber material.

Another aspect of the present application is to provide a carbon fiber material. The carbon fiber material includes a sizing agent formed from the aforementioned sizing agent composition, thereby subjecting the carbon fiber material to be equipped with good heat resistance and wear resistance.

Yet another aspect of the present application is to provide a composite material. The composite material includes the aforementioned carbon fiber material, and the carbon fiber material has excellent bonding properties with the resin matrix.

According to an aspect of the present application, a sizing agent composition is provided. The sizing agent composition comprises a first composition solution and a second composition solution. The first composition solution includes a polyamic acid, and the polyamic acid is formed by subjecting a dianhydride compound and a diamine compound to a reaction. A viscosity of the first composition solution is 10 cp to 5000 cp. The second composition solution includes a polyphenylene ether compound, and a molecular weight of the polyphenylene ether compound is 1,000 to 40,000. A weight ratio of the polyamic acid and the polyphenylene ether compound is 0.1 to 10.

According to some embodiments of the present application, the aforementioned polyphenylene ether compound is an aqueous compound.

According to some embodiments of the present application, the aforementioned first composition solution and the second composition solution are both aqueous solutions.

According to some embodiments of the present application, the aforementioned polyamic acid and the polyphenylene ether compound are respectively dispersed in the first composition solution and the second composition solution.

According to some embodiments of the present application, the aforementioned sizing composition can selectively include polyepoxide compounds. Based on an amount of the aforementioned polyamic acid and polyphenylene ether compound as 100 parts by weight, an amount of the polyepoxide compounds is 1 part by weight to 10 parts by weight.

According to some embodiments of the present application, the aforementioned polyepoxide compound is polymerized from ethylene oxide and/or propylene oxide.

According to some embodiments of the present application, the aforementioned sizing agent composition excludes epoxy resin compounds.

According to another aspect of the present application, a carbon fiber material is provided. The carbon fiber material includes a carbon fiber and a sizing agent. The sizing agent covers the carbon fiber, and the sizing agent includes the aforementioned sizing agent composition.

According to some embodiments of the present application, the aforementioned sizing agent composition further comprises a polyepoxide compound. Based on a total amount of the polyamic acid and the polyphenylene ether compound as 100 parts by weight, an amount of the polyepoxide compound is 1 part by weight to 10 parts by weight.

According to some embodiments of the present application, a polyamic acid in the sizing agent composition is reacted to form a polyimide when the carbon fiber material is heated to an imidization temperature.

According to some embodiments of the present application, the aforementioned imidization temperature is not lower than 340° C.

According to some embodiments of the present application, the aforementioned sizing agent is an aqueous product.

According to some embodiments of the present application, a concentration of the aforementioned sizing agent is 0.2 wt % to 5 wt %.

According to some embodiments of the present application, a sizing ratio of the aforementioned carbon fiber material is 0.5% to 4%.

According to some embodiments of the present application, a heat loss ratio of the aforementioned carbon fiber material at 400° C. is not larger than 1.2% of the sizing agent itself.

According to yet another aspect of the present application, a composite material is provided. The composite material includes a resin matrix and the aforementioned carbon fiber material. The resin matrix includes polyether ether ketone (PEEK), polyether ketone ketone (PEKK) and/or polyaryl ether ketone (PAEK). The carbon fiber material is dispersed in the resin matrix.

According to some embodiments of the present application, an interfacial shear strength of the aforementioned carbon fiber material to the resin matrix is not less than 20 MPa.

In the sizing agent composition, the carbon fiber material and the composite material of the present application, the heat resistance and wear resistance of the carbon fiber material are improved by the specific composition solutions. Moreover, the carbon fiber material has excellent bonding properties to the high performance engineering plastic with the sizing agent of the present application, such that the composite material with excellent properties can be produced. Besides, when the high performance engineering plastic is processed, the sizing agent on a surface of the carbon fiber material is hard to be cracked due to high temperature because the carbon fiber material has excellent heat resistance, and therefore it can ensure that the composite material has good processability.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
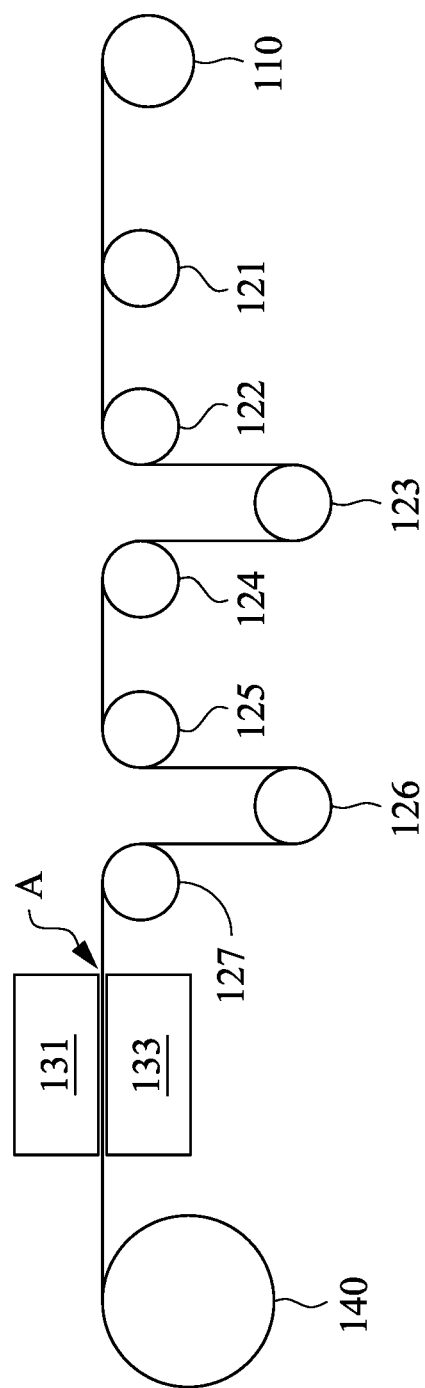
FIG. 1 illustrates a schematic diagram of a measuring device of hairiness according to some embodiments of the present application.

Reference will now be made in detail to the present embodiments of the invention, examples of which are illustrated in the accompanying drawings. Wherever possible, the same reference numbers are used in the drawings and the description to refer to the same or like parts.

According to the following description, although the sizing agent of the present application is used to cover on a carbon fiber to form a carbon fiber material and further used to produce a carbon fiber composite material, the present application is not limited to this. The sizing agent of the present application can also be applied to other types of fiber materials.

The sizing agent of the present application is formed from a sizing agent composition, and the sizing agent composition can comprise a first composition solution and a second composition solution. The first composition solution includes a polyamic acid, a solvent and a surfactant. There are no specific limitations to the solvent and surfactant as long as emulsified droplets of the polyamic acid can be uniformly dispersed in the solvent by them. Preferably, the solvent of the first composition solution can be water, and the surfactant can be, for example, an alkyl copolymer of polyethylene oxide and polypropylene oxide.

In some examples, the dianhydride compound may include but be not limited to tetrabenzoic anhydride, 4,4'-biphenyl ether dianhydride, 2,3,3',4'-diphenyl ether tetracarboxylic dianhydride, 3,3',4,4'-benzophenone tetracarboxylic dianhydride, 1,2,3,4-cydopentane tetracarboxylic dianhydride, other suitable dianhydride compounds, or a combination thereof, and the diamine compound may include but be not limited to 4,4'-diaminodiphenyl ether, p-phenylenediamine, 3,3'-dimethyl-4,4'-diaminodicyclohexylmethane, 3,3'-dimethyl diphenylamine, 4,4'-diaminobenzophenone, 4,4'-ethylene diphenylamine, other suitable diamine compounds, ammonium or metal salts of the aforementioned diamine compounds, or a combination thereof.

There are no specific limitations to the individual amounts of the dianhydride compound and the diamine compound as long as the polyamic acid can be produced by reacting them.

A viscosity of the first composition solution can be 10 cp to 5000 cp, and preferably is 1000 cp to 3500 cp. If the viscosity of the first composition solution is lower than 10 cp, the strand integrity of the carbon fiber material cannot be improved by the sizing agent, and the fewer polyamic acid is hard to enhance properties of the carbon fiber material, such that the sizing agent cannot meet requirements of the application. If the viscosity of the first composition solution is greater than 5000 cp, the sizing agent has poor operability.

The second composition solution includes a polyphenylene ether compound, a solvent and a surfactant. Similar to the first composition solution, there are no specific limitations to the solvent and the surfactant of the second composition solution. Preferably, the solvent and the surfactant of the second composition solution are the same as those of the first composition solution.

In some examples, the polyphenylene ether compound can be a homopolymer and/or a copolymer, and it can include but be not limited to poly(2,6-dimethyl-1,4-phenylene)ether, poly(2-methyl-6-ethyl-1,4-phenylene)ether, poly(2,6-diethyl-1,4-phenylene)ether, poly(2-ethyl-6-propyl-1,4-phenylene)ether, poly(2,6-di-n-propyl-1,4-phenylene)ether, poly(2-methyl-6-n-butyl-1,4-phenylene)ether, poly(2-ethyl-6-isopropyl-1,4-phenylene)ether, poly(2-methyl-6-chloroethyl-1,4-phenylene)ether, poly(2-methyl-6-hydroxyethyl-1,4-phenylene)ether and/or other polyphenylene ether homopolymers; or a copolymer former from 2,6-dimethylphenol with one or two comonomers of 2,3,6-trimethylphenol and cresol. Preferably, the polyphenylene ether compound is an aqueous product.

A molecular weight of the polyphenylene ether compound can be 1000 to 40000, and preferably is 15000 to 23000. If the molecular weight of the polyphenylene ether compound is lower than 1000, the properties of the carbon fiber material cannot be enhanced by the sizing agent, and therefore the carbon fiber material cannot meet the requirements. If the molecular weight of the polyphenylene ether compound is greater than 40000, flexibility of the carbon fiber material is excessively lowered and the operability thereof is affected, although the other properties thereof can be efficiently improved.

A weight ratio of the aforementioned polyamic acid and the polyphenylene ether compound can be 0.1 to 10, and preferably is 0.33 to 3. If the weight ratio of the polyamic acid and the polyphenylene ether compound is not within the aforementioned range, the heat resistance, the bonding properties and the wear resistance of the carbon fiber material cannot be efficiently improved by the sizing agent, and it cannot meet the application requirements of the composite material.

In some embodiments, the first composition solution is composed of the polyamic acid, the surfactant and water, and the second composition solution is composed of the polyphenylene ether compound, the surfactant and water. Therefore, the sizing agent is merely composed of the polyamic acid, the polyphenylene ether compound, the surfactant and water.

In some embodiments, the sizing agent composition may selectively include a polyepoxide compound, and the polyepoxide compound may be polymerized from ethylene oxide and/or propylene oxide. When the sizing agent composition includes the polyepoxide compound, the wear resistance and the strand integrity of the carbon fiber material are further improved. In some embodiments, a molecular weight of the polyepoxide compound may be 400 to 10000, and preferably is 900 to 4000. When the molecular weight of the polyepoxide compound is within the aforementioned range, enhancements of the properties and operability of the carbon fiber material can both improved by the sizing agent.

Based on a total amount of the aforementioned polyamic acid and the polyphenylene ether compound, an amount of the polyepoxide compound is 1 part by weight to 10 parts by weight, and preferably is 1 part by weight to 5 parts by weight.

Preferably, the produced sizing agent of the present application can be an aqueous product with better operability. Therefore, the first composition solution and the second composition solution are preferably both aqueous products. In some embodiments, a concentration of the sizing agent may be 0.2 wt % to 5 wt %, and preferably is 0.5 wt % to 3 wt %. When the concentration of the sizing agent is within the aforementioned range, the sizing agent can be efficiently covered on a surface of the carbon fiber with excellent operability, thereby efficiently improving the heat resistance and the wear resistance of the carbon fiber material, and further the requirements of the following composite material can be satisfied.

The sizing agent can be covered on the surface of the carbon fiber with conventional sizing apparatus and methods, thereby improving properties of the carbon fiber material of the present application. For example, the carbon fibers can be carbon fibers produced by conventional techniques, or common commercial products. There is a need to remove the sizing liquid on the surface of the carbon fibers (such as common commercial product) prior to cover the sizing agent of the present application. And then, the carbon fiber material of the present application can be produced after sizing, extruding and drying. In some examples, a sizing ratio of the carbon fiber material of the present application may be 0.5% to 4%, and preferably is 1% to 3%. When the sizing ratio of the carbon fiber material is within the aforementioned range, the carbon fiber material has better heat resistance, wear resistance and strand integrity.

The carbon fiber material of the present application can be further blended into a resin matrix to produce the carbon fiber composite material. The resin matrix may include but be not limited to polyether ether ketone (PEEK), polyether ketone ketone (PEKK), polyaryl ether ketone (PAEK), other suitable high performance engineering plastic materials, other suitable resin materials, or a combination thereof. It can be realized that the carbon fiber material of the present application has excellent heat resistance, and therefore the sizing agent of the present application can still cover on the surface of the carbon fiber well at processing temperature (such as above 340° C.) of the high performance engineering plastics such as PEEK, PEKK and PAEK. During the high temperature processing processes, the polyamic acid in the sizing agent can be thermally cyclized to be reacted to form polyimide, further subjecting the carbon fiber material to be equipped with much better heat resistance and enhancing bonding properties between the carbon fiber material and the resin matrix. Moreover, $\pi$-$\pi$ interaction is formed between the polyphenylene ether compound in the sizing agent and aromatic ring structures of the resin matrix, thereby enhancing the bonding properties between the carbon fiber covered by the sizing agent of the present application and the resin matrix, and further improving the properties of the composite material. Besides, stiffness of the carbon fiber material can be moderately lowered by the polyphenylene ether compound in the sizing agent, therefore meeting the processing requirements of the following applications.

In some application examples, the heat loss ratio of the carbon fiber material of the present application at 400° C. is not larger than 1.2%, and the interfacial shear strength of the carbon fiber material for high performance engineering plastic materials (such as PEEK) is not less than 20 MPa.

Several embodiments are described below to illustrate the application of the present application. However, these embodiments are not used for limiting the present application. For those skilled in the art of the present application, various variations and modifications can be made without departing from the spirit and scope of the present application.

Producing First Composition Solution

Dimethyl ethanolamine with a concentration of 10 wt % was added into a polyamic solution with a concentration of 60 wt % (the solvent was N-methylpyrrolidone (NMP)), and water was slowly added at a shear force of 1300 S−1 to be diluted to obtain a dark brown emulsion (i.e. the first composition solution) with a viscosity of 3000 cp, and a concentration of polyamic acid in the emulsion was 30 wt %. The surfactant in the first composition solution was a common surfactant (such as polyoxyalkylene alkyl ethers, for example, the commercial products produced by EnHou Polymer Chemical Ind. Co., Ltd., and the trade name was DME-350, 425, 750, 1000, 2000 or 3000; BAE-1000 or 2000; or the like).

Producing Second Composition Solution 20 g of polyphenylene ether resin (produced by Asahi Kasei Corporation, the trade name was Xyron™, and molecular weight was 18000) and 200 mL of dichloroethane were added into a four-necked flask, nitrogen gas was introduced, and the solution was continuously stirred at 55° C. A polyphenylene ether solution was obtained.

0.82 g (0.0084 moles) of concentrated sulfuric acid and 1.67 grams (0.0168 moles) of acetic anhydride were placed in an ice bath. And then, 2 mL of dichloroethane was added dropwise to the concentrated sulfuric acid and the acetic anhydride to obtain the sulfonating agent.

The sulfonating agent was added dropwise into the polyphenylene ether solution and stirred uniformly at 55° C. After stirring for 2 hours, 8.9 g of methanol solution (containing 0.025 moles of dimethylethanolamine, and a concentration was 25 wt %) was added, and the mixture was stood at 55° C. for 30 minutes. The precipitate was washed with methanol until neutral, and then dried under vacuum at 100° C. to obtain polyphenylene ether sulfonate. The polyphenylene ether sulfonate was added to dimethyl sulfoxide and acetone (DMSO/acetone was 8/2) to form a mixed solution with a concentration of 80 wt %. Then, water was slowly added to form an emulsion, and a concentration of the polyphenylene ether compound in the emulsion was 30 wt %, therefore producing the second composition solution. The second composition solution adopted the same surfactant as the first composition solution.

fibers were introduced into an infrared heater to be subjected to a drying process (drying at 150° C. for 2 minutes). After then, the tension of the carbon fibers was adjusted to 1000 cN by rollers to produce the carbon fiber material of Embodiment 1. The carbon fiber material was evaluated by the following evaluation methods of filament width, strand integrity, sizing ratio, hairiness, stiffness, interfacial shear strength (IFSS) and heat loss, and the results were shown in Table 1.

Embodiment 2 to Embodiment 9 and Comparative Embodiment 1 to Comparative Embodiment 3

Embodiments 2 to 9 and Comparative Embodiments 1 to 3 were practiced with the same method as in Embodiment 1 by using various kinds or amounts of raw materials of the sizing agent. The compositions and evaluated results thereof were listed in Table 1 rather than focusing or mentioning them in details. It should be noted that the polyepoxide compound adopted in Embodiment 6 was manufactured by EnHou Polymer Chemical Ind. Co., Ltd., and the trade name was PEG-400, the polyepoxide compound adopted in Embodiment 7 was manufactured by EnHou Polymer Chemical Ind. Co., Ltd., and the trade name was DP-7530, and the polyepoxide compounds adopted in Embodiments 8 and 9 were both manufactured by EnHou Polymer Chemical Ind. Co., Ltd., and the trade name was GC-8548. Besides, the evaluated results of filament width, strand integrity, hairiness and stiffness of the carbon fiber material of Comparative Embodiment 3 cannot be measured.

TABLE 1

| | | | Embodiment | | | | | | | | | Comparative Embodiment | | |
|---|---|---|---|---|---|---|---|---|---|---|---|---|---|---|
| | | | 1 | 2 | 3 | 4 | 5 | 6 | 7 | 8 | 9 | 1 | 2 | 3 |
| sizing agent | composition (parts by weight) | first composition solution | 75 | 75 | 100 | 100 | 50 | 50 | 50 | 50 | 50 | | 100 | |
| | | second composition solution | 25 | 50 | 33 | 66 | 50 | 50 | 50 | 50 | 50 | | | 100 |
| | | polyepoxy compound | | | | | | 10 | 10 | 10 | 5 | | | |
| | | epoxy sizing liquid | | | | | | | | | | 100 | | |
| | concentration (wt %) | | 1.00 | 1.25 | 1.33 | 1.66 | 1.00 | 1.10 | 1.10 | 1.10 | 1.05 | 1.50 | 0.55 | 2.00 |
| Evaluation method | filament width (mm) | | 6 | 5 | 4 | 5 | 6 | 5 | 5 | 5 | 5 | 5 | 5 | X |
| | strand integrity (g/mm) | | 18.3 | 17.2 | 29.5 | 25.4 | 11.6 | 16.4 | 16.0 | 15.8 | 15.0 | 6 | 17.5 | X |
| | sizing ratio (%) | | 2.12 | 2.72 | 3.02 | 3.33 | 1.71 | 2.14 | 2.26 | 2.28 | 2.02 | 1.10 | 1.30 | 1.20 |
| | hairiness (mg) | | 2.3 | 1.9 | 2.1 | 1.9 | 5.2 | 0 | 0 | 0 | 0 | 0 | 20 | X |
| | stiffness (g) | | 110 | 86 | 117 | 127 | 70 | 82 | 80 | 79 | 75 | 30 | 87.5 | X |
| | IFSS (MPa) | | 24.6 | 26.6 | 21.1 | 27.4 | 26.1 | 25.3 | 25.8 | 24.7 | 26 | 6.1 | 17.6 | 22.2 |
| | heat loss (%) | | 0.32 | 0.43 | 0.36 | 0.41 | 0.34 | 1.1 | 0.83 | 0.72 | 0.33 | 28.7 | 0.16 | 0.6 |

Producing Carbon Fiber Material

Embodiment 1

The first composition solution and the second composition solution were mixed in a ratio of 3:1 (75 parts by weight: 25 parts by weight) and diluted with water to form a sizing agent with a concentration of 1 wt %. Then, the carbon fibers were introduced into a sizing tank containing the sizing agent to be subjected to a sizing process. After the carbon fiber was immersed for 30 seconds, the sized carbon fibers were further passed through an extruding wheel to remove excess sizing agent, and then the extruded carbon Comparative Embodiment 4

Comparative Embodiment 4 was practiced with the same method as in Embodiment 1 by directly replacing the sizing agent of Embodiment 1 with water. The evaluated results of filament width, strand integrity and heat loss of the carbon fiber material of Comparative Embodiment 4 cannot be measured. The evaluated result of the sizing ratio of the carbon fiber material of Comparative Embodiment 4 was 20%, the evaluated result of hairiness was 105 mg, the evaluated result of stiffness was 9 g, and the evaluated result of IFSS was 11 MPa.

Evaluation Method
1. Filament Width and Strand Integrity

The Filament width and the strand integrity were measured by methods well known as skilled in the art rather than focusing or mentioning them in details.

2. Sizing Ratio

A weight ($W_i$) of the carbon fiber material was firstly measured, and then the carbon fiber material was subjected to Soxhlet extraction with N-methylpyrrolidone and acetone sequentially. After the carbon fiber material was extracted for 1 hour, it was placed in an oven at 80° C. to remove acetone, and a weight ($W_f$) of the dried carbon fiber material was measured. The sizing ratio was calculated with the following formula.

$$\text{Sizing ratio} = \frac{(W_i - W_f)}{W_f} \times 100\%$$

3. Hairiness

The evaluation method of hairiness was measured with a device shown in FIG. 1. The carbon fiber material was firstly wound on the roller 110. Next, the carbon fiber material was introduced to pass through the rollers 121, 122, 123, 124, 125, 126 and 127 in sequence with a tension of 600 cN and a speed of 1 meter per minute, and then the carbon fiber material passed through the gap between the two sponge pads 131 and 133, and it was further wound on a take-up wheel 140. The surfaces of the rollers 121, 122, 123, 124, 125, 126 and 127 were not specially treated, and none of them had transmission equipment.

When the carbon fiber material passed through the gap between the sponge pads 131 and 133, the hairiness on the fiber surface can be blocked by the sponge pads 131 and 133 and was accumulated at the position A. After the carbon fiber material was wound for 30 meters, the hairiness at the position A was placed in an oven at 105° C. After drying for 40 minutes, the weight of the hairiness was measured.

4. Stiffness

Stiffness was evaluated by placing the carbon fiber material on a flat surface with a gap, and a distance of the gap was 5 mm. And then, a pressure was applied to the carbon fiber material over the gap, and the pressure was recorded when the carbon fiber material was bent.

5. Interfacial Shear Strength

Figure 2:
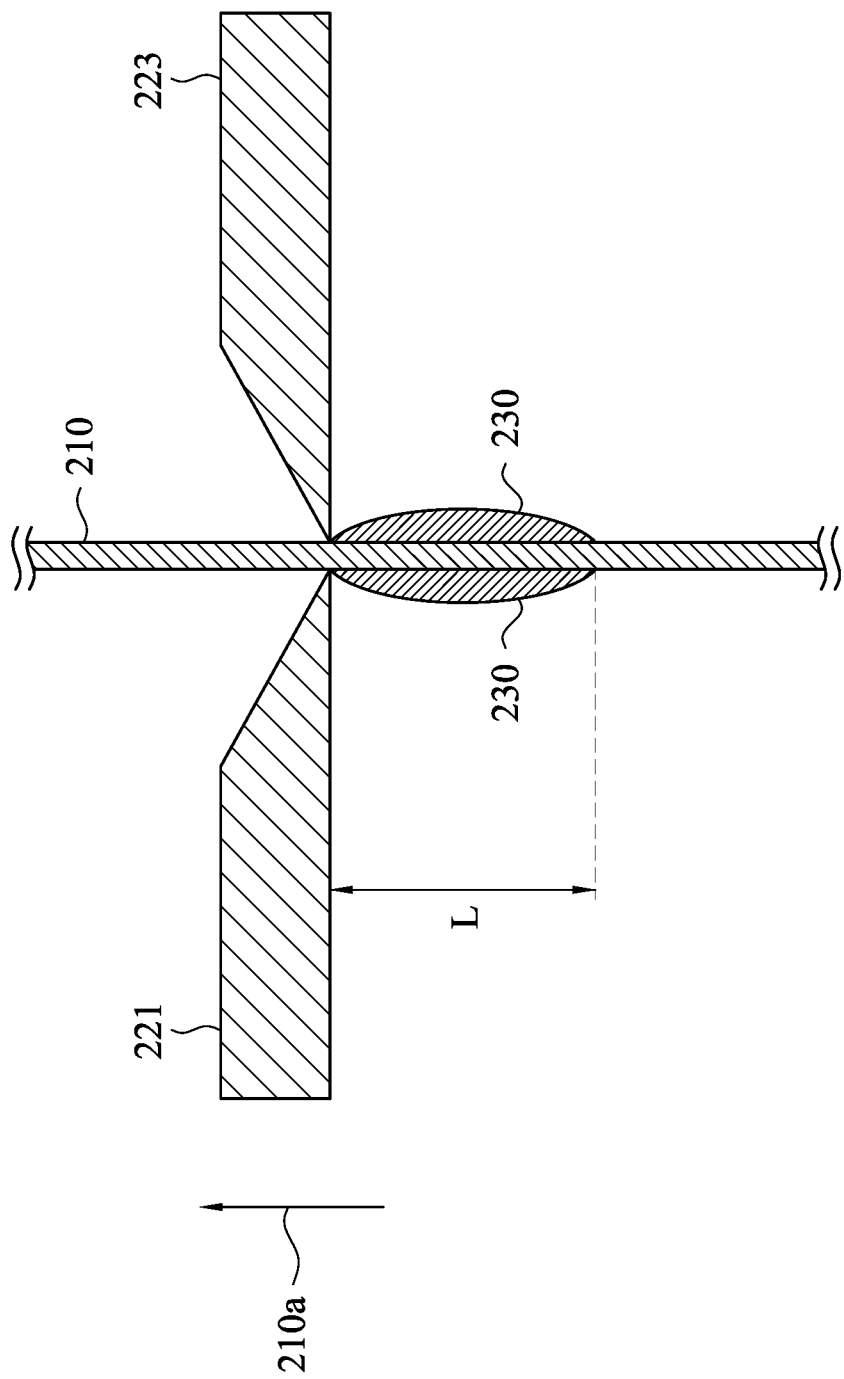
FIG. 2 illustrates a schematic cross-sectional view of a measuring device of interfacial shear strength according to some embodiments of the present application.

The interfacial shear strength (IFSS) between the carbon fiber material and the resin material was measured by the Micro-Droplet method of Tohei Sangyo Corporation, and it can be measured by a device shown in FIG. 2. Firstly, the carbon fiber material was dewatered at 350° C. After 1 minute, melted polyether ether ketone (manufactured by Solvay Company, and the trade name was KT880) was coated on the carbon fiber material. And then, a force (F) was applied to subject the carbon fiber material 210 to pass through the gap (the distance is equal to a diameter (d) of the carbon fiber material) between the scraping elements 221 and 223 along a direction 210a, so as to scrape off the resin material on the surface of the carbon fiber material 210 to form resin droplets 230. After a diameter (L) of the resin droplet 230 was measured, the interfacial shear strength (τ) between the carbon fiber material and the resin material can be calculated with the following formula.

$$\tau = \frac{F}{\pi dL}$$

6. Heat Loss 1 g of the carbon fiber material was placed in an oven at 350° C., and a weight ($W_i$) thereof was measured after it was dewatered for 1 minute. Next, it was placed in a high temperature oven at 400° C. After 10 minutes, a weight ($W_f$) was measured, and the heat loss of the carbon fiber material was calculated with the following formula.

$$\text{Heat loss} = \frac{(W_i - W_f)}{\text{Sizing ratio}}$$

As shown in Table 1, when the surface of the carbon fiber was coated with the sizing agent of the present application, the carbon fiber material had lower heat loss and hairiness, and therefore it had better heat resistance and wear resistance. Moreover, the carbon fiber material of the present application also had higher interfacial shear strength, such that the carbon fiber material had better bonding properties with the high performance engineering plastics such as polyether ether ketone with the covering of the sizing agent of the present application. Accordingly, when the high performance engineering plastics were processed at higher temperature, the sizing agent on the carbon fiber material can still resist the high temperature without being thermally decomposed, thereby meeting the requirements of the application. Besides, when the sizing agent composition comprised polyepoxide compounds, the sizing agent can more efficiently enhance the wear resistance of the carbon fiber material and maintain the bonding properties between the carbon fiber material and the high performance engineering plastics though the heat resistance of the carbon fiber material was slightly reduced. Furthermore, the sizing agent of the present application can be converted the carbon fiber material to a heat resistant structure at a high temperature of 350° C. (the treatment period was about 1 minute) before the carbon fiber material was subjected to a thermal processing, and further the compositions that were not resisted to high temperature were removed to efficiently lower heat loss of the carbon fiber material. In Comparative Embodiment 1, although the conventional epoxy resin sizing agent of the carbon fiber materials can effectively improve the wear resistance of the carbon fiber materials, it had poor heat resistant and cannot improve the bonding properties between the carbon fiber material and the high performance engineering plastics.

Accordingly, the sizing agent formed from the sizing agent composition of the present application can efficiently improve the heat resistance and the wear resistance of the carbon fiber material, and it facilitates to enhance the bonding properties between the carbon fiber material and the high performance engineering plastics, thereby improving the processability of the composite materials.

As is understood by a person skilled in the art, the foregoing preferred embodiments of the present application are illustrated of the present application rather than limiting of the present application. In view of the foregoing, it is intended to cover various modifications and similar arrangements included within the spirit and scope of the appended claims. Therefore, the scope of which should be accorded the broadest interpretation so as to encompass all such modifications and similar structure.

What is claimed is:

1. A sizing agent composition, comprising:
 a first composition solution, including a polyamic acid, wherein the polyamic acid is formed by subjecting a dianhydride compound and a diamine compound to a reaction, and a viscosity of the first composition solution is 10 cp to 5000 cp; and a second composition solution, including a polyphenylene ether compound, wherein a molecular weight of the polyphenylene ether compound is 1,000 to 40,000, and a weight ratio of the polyamic acid and the polyphenylene ether compound is 0.1 to 10.

2. The sizing agent composition of claim 1, wherein the polyphenylene ether compound is an aqueous compound.

3. The sizing agent composition of claim 1, wherein the first composition solution and the second composition solution are both aqueous solutions.

4. The sizing agent composition of claim 3, wherein the polyamic acid and the polyphenylene ether compound are respectively dispersed in the first composition solution and the second composition solution.

5. The sizing agent composition of claim 1, further comprising:

a polyepoxide compound, wherein based on a total amount of the polyamic acid and the polyphenylene ether compound as 100 parts by weight, an amount of the polyepoxide compound is 1 part by weight to 10 parts by weight.

6. The sizing agent composition of claim 5, wherein the polyepoxide compound is polymerized from ethylene oxide and/or propylene oxide.

7. The sizing agent composition of claim 1, wherein the sizing agent composition excludes epoxy resin compounds.

8. A carbon fiber material, comprising:

a carbon fiber; and a sizing agent, covering the carbon fiber, wherein the sizing agent comprises a sizing agent composition of claim 1.

9. The carbon fiber material of claim 8, wherein the sizing agent composition further comprises a polyepoxide compound, and based on a total amount of a polyamic acid and a polyphenylene ether compound in the sizing agent composition as 100 parts by weight, an amount of the polyepoxide compound is 1 part by weight to 10 parts by weight.

10. The carbon fiber material of claim 8, wherein when the carbon fiber material is heated to an imidization temperature, a polyamic acid in the sizing agent composition is reacted to form a polyimide.

11. The carbon fiber material of claim 10, wherein the imidization temperature is not lower than 340° C.

12. The carbon fiber material of claim 8, wherein the sizing agent is an aqueous product.

13. The carbon fiber material of claim 8, wherein a concentration of the sizing agent is 0.2 wt % to 5 wt %.

14. The carbon fiber material of claim 8, wherein a sizing ratio of the carbon fiber material is 0.5% to 4%.

15. The carbon fiber material of claim 8, wherein a heat loss ratio of the carbon fiber material at 400° C. is not larger than 1.2%.

16. A composite material, comprising:

a resin matrix, including polyether ether ketone (PEEK), polyether ketone ketone (PEKK) and/or polyaryl ether ketone (PAEK); and a carbon fiber material of claim 8, dispersed in the resin matrix.

17. The composite material of claim 16, wherein an interfacial shear strength of the carbon fiber material to the resin matrix is not less than 20 MPa.

* * * * *